Feb. 13, 1934.   R. P. COURTNEY   1,946,932
LAMINATED PRODUCTS
Filed June 8, 1929
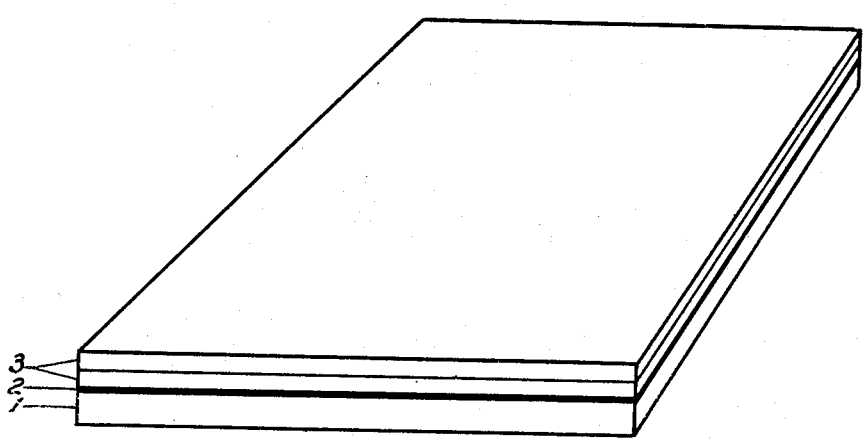
INVENTOR.
Robert P. Courtney
BY
ATTORNEYS.

Patented Feb. 13, 1934

1,946,932

UNITED STATES PATENT OFFICE 1,946,932

LAMINATED PRODUCT

Robert P. Courtney, Maplewood, N. J., assignor to Bakelite Corporation, New York, N. Y., a corporation of Delaware Application June 8, 1929. Serial No. 369,532

3 Claims. (Cl. 154—40)

This invention relates to laminated products that include the use of resinoids, that is, resinous products obtained, for example, in the reaction of a phenol with a methylene-containing agent, such as formaldehyde, and characterized by an initial fusible and soluble stage, commonly termed reactive, which is transformable to a final infusible and insoluble stage by the action of heat. These resinoids have permanence, inertness and capability of being finished with a high gloss rendering them very desirable, but their high cost as compared with other materials places restrictions upon their use. To lessen the cost and thus extend the field of usefulness it has been proposed to employ resinoid compositions as surfacing materials to metals, wood and other less expensive substances, by applying directly thereto paper that is impregnated with a resinoid in a reactive condition and converting the resinoid to its set or infusible condition under the action of heat and pressure. This, however, has not been found to be commercially feasible for the reason among others that the resinoid compositions tend to delaminate or separate from the surface of the base or foundation materials.

I have discovered that if there is interposed a cement consisting preferably of a rubber isomer obtained by heating rubber with approximately 4 to 5 percent of concentrated sulfuric acid or equivalent amounts of a sulfonic acid for 4 to 10 hours at about 120 to 140° C. a satisfactory bond between reacted or heat-hardened resinoid compositions and metals, wood, etc. is obtained and there is no tendency toward delamination in the resulting articles. As a further improvement I have found that resinoid compositions in the reactive stage, such as paper impregnated with reactive resinoid, can be secured to base materials by this cement and the assembly then can be submitted to heat and pressure by the action of which the resinoid is converted from the fusible or heat-plastic condition to the final infusible condition, and at the same time a strongly adherent permanent bond is formed between the resinoid composition and the underlying material.

A method of carrying out this invention comprises coating the metal, wood or other material to be surfaced with the acid-treated rubber cement and drying the cement to a sticky condition. The cement coating is then overlaid with one or more sheets of paper, cloth or other suitable material impregnated with or otherwise provided with a phenolic or other suitable resinoid. This construction is illustrated in the figure of the accompanying drawing, a base material 1 having applied thereto a layer of cement 2 and superimposed sheets 3 of impregnated paper; these are shown on an enlarged scale for the sake of clearness. If desired untreated paper, cloth, etc. for instance, a sheet of kraft paper, may be placed between the coated material and the resinoid surfacing material but this is not essential to securing an adherent bond. The stack so formed is then pressed between hot metal plates under pressures which may vary from 100 to 2,000 pounds or more per square inch at temperatures ranging from 100 to 135° C. or more for a few minutes or until the resinoid has been set to its infusible condition. The factors of pressure, temperature and period of time are interrelated and depend upon the nature of the resinoid used, its condition of reactivity, presence of plasticizing agents, etc., and no substantial departure from or modification of these factors is found necessary on account of the interposition of the acid-treated rubber cement. The molded piece is preferably cooled while in the press before the pressure is released in order that a surface of high gloss without imperfections may be obtained.

When the cement is made use of to secure a resinoid composition in the set or infusible condition as a veneer or covering for a base or foundation material, it is not essential that heat be applied as the cement will set by drying at normal room temperatures. The drying period, however, entails a period of time varying from approximately ½ to 48 hours or more depending upon the size of the piece and the character of the base material. In comparison, the method exemplified above is preferable as the cementing action is accomplished in the few minutes that the stack is under heat and pressure, the resinoid composition is applied in a heat-plastic condition and therefore comformable to surface irregularities, and the conversion to the infusible condition takes place during the same operation.

In the preparation of the cement agents other than concentrated sulfuric acid that have been found useful are p-phenol sulfonic acid, p-toluene sulfonyl chloride and related compounds. The digested mass does not require purification except washing in water to remove excess acid. Plasticizers such as tung oil, mineral rubber, etc. can be incorporated and preservatives of the nature of benzidine, etc. can be included. Furthermore the acid-treated rubber may be diluted or extended with resinoids either in the reactive or reacted condition including resinoids of the flexible phenolic type as hereinafter described.

For some purposes, particularly where there is no danger of impact or flexure, it is not essential that the rubber be digested with acids of the nature described, for a rubber cement of solution of rubber in solvents when extended by the inclusion of a medium such as a phenolic resinoid is found in such instances to afford an effective bond between a resinoid composition sheet and a base material. Such a cement, for example, can be made by preparing a resinoid from about 60 parts tung oil and 40 parts of cresol which are reacted in the presence of phosphoric acid and adding to the product about 15 parts of hexamethylenetetramine. This is partially reacted or advanced to the infusible condition and then added hot to a solution of raw rubber in solvents of the coal tar type such as toluene, etc. The solution when applied to surfaces to be cemented is heated to drive off the solvents prior to pressing the surfaces together.

While the invention is primarily directed to the use of resinoids obtained in the reaction of phenol and formaldehyde it is not so restricted, and compositions containing other resinoids such as the glyptal and the urea type of resinoids may be likewise bonded to metals and other materials by the use of the cement here specified.

The resinoid surfacing compositions can be pigmented to give various color effects, or they can be grained, printed or otherwise treated to imitate wood, etc. or to incorporate any desired design. Since products are obtainable by means of this invention that have for example the strength of steel by using steel as the base material and that possess the excellent, permanent and inert exterior finish of a resinoid, a great variety of applications, such as instrument boards and garnish rails for automobiles, radio panels, window sills, furniture, etc. are made possible.

I claim:

1. A process of preparing a laminated article which comprises applying a cement obtained in the treatment of rubber with sulfuric acid to a base material, superimposing thereon a composition containing a resinoid in reactive condition, and applying heat and pressure to the resulting product to set the resinoid and simultaneously bond the resinoid composition to the base material.

2. Process of preparing an article which comprises applying a binder comprising a cement obtained from rubber to a base material, superimposing thereon a composition containing a resinoid in reactive condition, and applying heat and pressure to the assembly to set the resinoid and simultaneously bond the resinoid composition to the base material.

3. Process of preparing an article which comprises applying to the base material a binder comprising an acid treated rubber, superimposing thereon a material presenting a surface of a composition containing a resinoid, and applying heat and pressure to the assembly to cause a change in the resinoid and simultaneously to bond the resinoid composition to the base material.

ROBERT P. COURTNEY.